No. 796,301. PATENTED AUG. 1, 1905.
P. J. DEVINE.
PIG TROUGH.
APPLICATION FILED JULY 12, 1904.
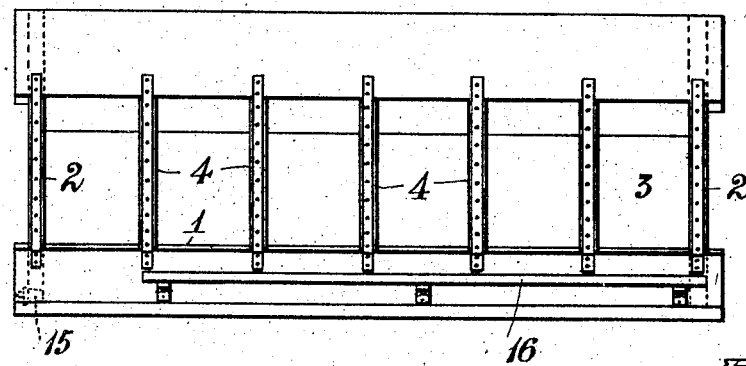
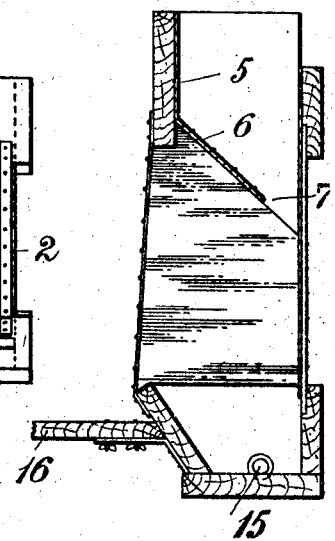
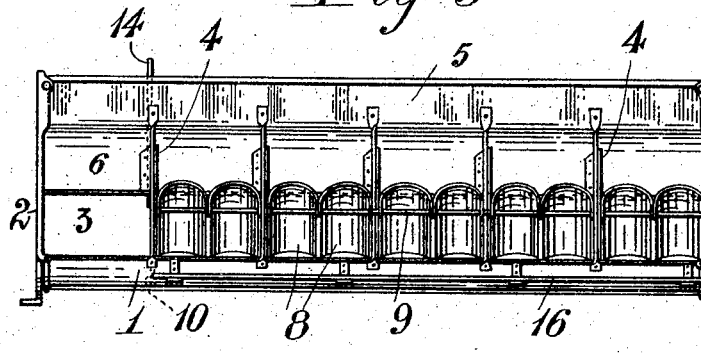
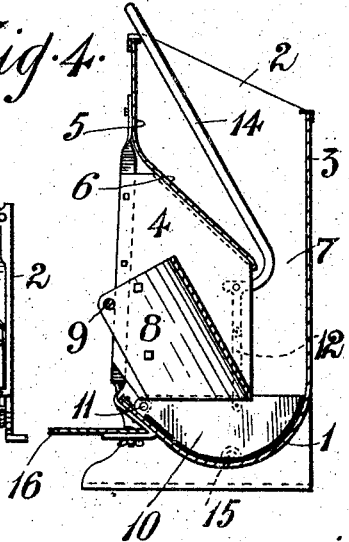
Witnesses
Walker C. Hart
William F. Harris
Inventor
Patrick Joseph Devine
by Edw<sup>d</sup> Waters & Son
Attorneys

UNITED STATES PATENT OFFICE.

PATRICK JOSEPH DEVINE, OF YARRAGON, VICTORIA, AUSTRALIA.

PIG-TROUGH.

No. 796,301.          Specification of Letters Patent.          Patented Aug. 1, 1905.

Application filed July 12, 1904. Serial No. 216,279.

*To all whom it may concern:*

Be it known that I, PATRICK JOSEPH DEVINE, farmer, a subject of the King of Great Britain, residing at Bowden street, Yarragon, in the State of Victoria, Commonwealth of Australia, have invented an Improved Pig-Trough, of which the following is a specification.

This invention has been devised in order to provide a feeding device which will enable a number of pigs to be fed simultaneously in such a manner that each will secure its full share of the food without molestation from its neighbor, while other advantages are that the animals cannot foul the food nor interfere with the person feeding them.

The device briefly consists of a long trough above which are a number of partitions dividing the whole into stalls of just sufficient width to admit the head of a full-grown pig. These stalls may be again subdivided by removable hoods to facilitate the feeding of a litter of pigs. The food is fed into the trough through a feed hopper or chute situated above the stalls.

The appended sheet of drawings, illustrating the invention, comprise, Figure 1, a front elevation, and, Fig. 2, an enlarged vertical section, of the device constructed principally of wood, while Figs. 3 and 4 are similar views, respectively, to Figs. 1 and 2, but showing the device constructed of metal.

Referring now to the drawings, 1 represents the food-trough supported by the sides 2 and back 3, while 4 4 are the vertical dividing-partitions, which are rigidly mounted above the trough and divide the whole into a series of stalls. These partitions when formed in wood preferably extend to the back 3, as shown in Fig. 2, but when formed in metal extend about two-thirds the width from the front, this variation being merely a detail of construction.

Above the partitions 4 is a feed hopper or chute 5, extending the full length of the trough, having a rearwardly-inclined bottom 6 and an opening 7 at its lower end. Thus the food may be supplied from the rear and all danger from the ferocity of the animals is obviated.

The arrangement for feeding a litter of pigs is shown only in Figs. 3 and 4, though it is applied in exactly the same manner with the wooden device shown in Figs. 1 and 2. It consists in two rearwardly-inclined hoods 8, placed between each of the rigid partitions 4 and secured thereto by nuts, as shown. Each pair of these hoods 8 are preferably formed out of a single sheet of metal and of such a width that only the head of a young pig may enter. Near the upper front corners of the hoods 8, which project beyond the front edges of the rigid partitions 4, a horizontal rod 9 is passed through in order to prevent the sow from getting her snout into the trough. This rod may be made in lengths equal to the width between the rigid partitions 4, so that any number of the stalls may be subdivided.

In actual practice the device would be divided as shown in Fig. 3, wherein one stall is provided for the sow and the rest subdivided by the hoods 8 for the litter.

In order to divide the trough transversely to supply different food to the sow, a plate 10, conforming to the shape of the trough, is hinged, as at 11, to the edge of same beneath the partition dividing the sow from the litter and is connected by a link 12 to a crank-lever 14, operated from the rear, so that said plate may be raised and lowered at will. The plate 10 has a rubber or other suitable packing let into its bottom edge for the purpose of forming a water-tight joint when said plate is lowered. Any surplus food left by the litter may thus be run into the sow's stall. In the end of the trough a plug 15 is inserted for the purpose of removing the sour food and cleansing the trough.

In order to enable the young pigs to reach their food conveniently, a detachable platform 16 is provided on the front of the trough, as shown.

By the foregoing it will be seen that the stalls are so arranged that only the sized pig for which said stalls are destined can use them, and, furthermore, the animals cannot get into the trough and foul the food.

Having now fully described and ascertained my said invention and in what manner the same is to be performed, I declare that what I claim is—

1. In a pig-trough a number of rearwardly-inclined hoods secured together above the trough in combination with a horizontal rod extending through the upper front corners of said hoods substantially as and for the purpose set forth.

2. In a pig-trough having partitions and an overhead food-hopper, a pair of rearwardly-inclined hoods bolted to said partitions and a horizontal rod passed through holes in the front corners of said hoods and a platform affixed to the front of the trough all substantially as set forth and as illustrated in the drawings.

3. In a pig-trough, means for dividing the trough transversely consisting in a plate, hinged to the front edge of the trough and having a water-tight packing on its bottom edge, a crank-lever, and a link connecting the plate to said lever, substantially as set forth and illustrated.

In testimony whereof I have hereunto set my hand in presence of two subscribing witnesses.

PATRICK JOSEPH DEVINE.

Witnesses:
EDWARD NEEDHAM WATERS,
WILLIAM HERBERT WATERS.